United States Patent
Hoshito

(10) Patent No.: US 12,509,105 B2
(45) Date of Patent: Dec. 30, 2025

(54) IN-VEHICLE EQUIPMENT SETUP DEVICE, IN-VEHICLE EQUIPMENT SETUP METHOD, AND STORAGE MEDIUM

(71) Applicant: HONDA MOTOR CO., LTD., Tokyo (JP)

(72) Inventor: Ayaka Hoshito, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 93 days.

(21) Appl. No.: 18/588,060

(22) Filed: Feb. 27, 2024

(65) Prior Publication Data
US 2024/0300511 A1    Sep. 12, 2024

(30) Foreign Application Priority Data
Mar. 8, 2023  (JP) .................................. 2023-035569

(51) Int. Cl.
*B60W 50/14*     (2020.01)
*B60W 50/00*     (2006.01)

(52) U.S. Cl.
CPC ..... *B60W 50/14* (2013.01); *B60W 2050/0083* (2013.01); *B60W 2050/143* (2013.01); *B60W 2050/146* (2013.01); *B60W 2540/21* (2020.02)

(58) Field of Classification Search
None
See application file for complete search history.

(56) References Cited

U.S. PATENT DOCUMENTS

2005/0222726 A1   10/2005  Furui et al.
2019/0315297 A1   10/2019  Yamada et al.
(Continued)

FOREIGN PATENT DOCUMENTS

JP   09-258805    10/1997
JP   2005-297616  10/2005
(Continued)

OTHER PUBLICATIONS

Japanese Office Action for Japanese Patent Application No. 2023-035569 mailed Dec. 3, 2024.

*Primary Examiner* — Christian Chace
*Assistant Examiner* — Shayne M. Gilbertson
(74) *Attorney, Agent, or Firm* — Amin, Turocy & Watson, LLP

(57) ABSTRACT

An in-vehicle equipment setup device indicating mounting presence or absence of a plurality of pieces of in-vehicle equipment mounted in a vehicle and user setup information in which a setup of the in-vehicle equipment desired by a user is shown for each user, an equipment determiner to determine whether the in-vehicle equipment included in the in-vehicle equipment information is mounted equipment mounted in the vehicle or unmounted equipment not mounted in the vehicle, and a setter to perform the setup of the in-vehicle equipment shown in the user setup information based on the in-vehicle equipment information. The equipment determiner updates the in-vehicle equipment information based on a result of determining the mounted equipment and the unmounted equipment. The setter performs a setup indicated in the user setup information of the user that has been selected with respect to the in-vehicle equipment that is the mounted equipment.

6 Claims, 5 Drawing Sheets

(56) References Cited

U.S. PATENT DOCUMENTS

2022/0117143 A1* 4/2022 Kraus .................. A01D 41/141
2025/0123832 A1* 4/2025 Chimura ................... G06F 8/65

FOREIGN PATENT DOCUMENTS

| JP | 2013-236184 | 11/2013 | |
| JP | 2019-182231 | 10/2019 | |
| JP | 2019182231 A * | 10/2019 | ............ B60W 50/08 |
| JP | 2020-166074 | 10/2020 | |
| JP | 2022-152073 | 10/2022 | |
| WO | WO-2020218454 A1 * | 10/2020 | ............. B60K 35/00 |

* cited by examiner (b)

| SETUP ITEM | MOUNTING PRESENCE OR ABSENCE | COMMUNICATION STATE |
|---|---|---|
| A | MOUNTED | COMMUNICATION |
| B | MOUNTED | COMMUNICATION |
| C | UNMOUNTED | NO COMMUNICATION |
| ...... | ...... | ...... |
| N | MOUNTED | COMMUNICATION |

↑ IG_ON (a)

| SETUP ITEM | MOUNTING PRESENCE OR ABSENCE | COMMUNICATION STATE |
|---|---|---|
| A | UNMOUNTED | NO COMMUNICATION |
| B | UNMOUNTED | NO COMMUNICATION |
| C | UNMOUNTED | NO COMMUNICATION |
| ...... | ...... | ...... |
| N | UNMOUNTED | NO COMMUNICATION |

IN-VEHICLE EQUIPMENT SETUP DEVICE, IN-VEHICLE EQUIPMENT SETUP METHOD, AND STORAGE MEDIUM

CROSS-REFERENCE TO RELATED APPLICATION

Priority is claimed on Japanese Patent Application No. 2023-035569, filed Mar. 8, 2023, the content of which is incorporated herein by reference.

BACKGROUND OF THE INVENTION

Field of the Invention

The present invention relates to an in-vehicle equipment setup device, an in-vehicle equipment setup method, and a storage medium.

Description of Related Art

Conventionally, technology for setting a setup for operating various types of in-vehicle equipment mounted in a vehicle for each user of the vehicle has been disclosed (see, for example, Japanese Unexamined Patent Application, First Publication No. 2022-152073). Furthermore, in recent years, for example, in conjunction with a wireless communication type portable key such as a smart key, the setup of the in-vehicle equipment has been set according to a user carrying the portable key.

In recent years, cases where an operating system (OS) and an application for controlling in-vehicle equipment mounted in a vehicle are used for general purposes, and the same operating system or application is used in a plurality of vehicles, i.e., common use is made, have been considered. However, whether or not the in-vehicle equipment is mounted differs according to each vehicle (each vehicle model). Furthermore, even if the vehicle is of the same model, the in-vehicle equipment installed in each grade of the vehicle may be different. For this reason, it is necessary for the shared operating system or application to confirm what type of in-vehicle equipment is installed in the vehicle, which in-vehicle equipment can be controlled, or the like and to set up or control in-vehicle equipment indicated in an instruction. For this reason, a process in which the operating system or application sets up and operates in-vehicle equipment when an instruction to control the in-vehicle equipment is received from a user is time-consuming and the convenience of a manipulation on the in-vehicle equipment may not necessarily be improved for the user.

SUMMARY OF THE INVENTION

The present invention has been made on the basis of the recognition of the above problems and an objective of the present invention is to provide an in-vehicle equipment setup device, an in-vehicle equipment setup method, and a storage medium capable of appropriately setting up or controlling in-vehicle equipment for each user with an operating system or an application. That is, an objective of the present invention is to improve convenience by setting up or controlling in-vehicle equipment according to the user. In the end, it will further improve traffic safety and contribute to the development of a sustainable transportation system.

An in-vehicle equipment setup device, an in-vehicle equipment setup method, and a storage medium according to the present invention adopt the following configurations.

(1): According to an aspect of the present invention, there is provided an in-vehicle equipment setup device for performing a setup for operating each of a plurality of pieces of in-vehicle equipment mounted in a vehicle, the in-vehicle equipment setup device including: a storage configured to store at least in-vehicle equipment information in which mounting presence or absence information indicating whether or not the in-vehicle equipment has been mounted is shown and user setup information in which setup information about a setup of the in-vehicle equipment desired by a user of the vehicle is shown for each user; an equipment determiner configured to determine whether the in-vehicle equipment included in the in-vehicle equipment information is mounted equipment, which is the in-vehicle equipment mounted in the vehicle, or unmounted equipment, which is the in-vehicle equipment not mounted in the vehicle; and a setter configured to perform the setup of the in-vehicle equipment corresponding to the setup information shown in the user setup information based on the in-vehicle equipment information, wherein the equipment determiner updates the mounting presence or absence information included in the in-vehicle equipment information based on a result of determining the mounted equipment and the unmounted equipment, and wherein the setter performs a setup indicated in the setup information indicated in the user setup information of the user that has been selected with respect to the in-vehicle equipment that is the mounted equipment as indicated in the mounting presence or absence information included in the in-vehicle equipment information.

(2): In the above-described aspect (1), the in-vehicle equipment setup device further includes a communicator configured to communicate with the in-vehicle equipment, wherein the equipment determiner determines that the in-vehicle equipment for which the communication has been established in the communicator is the mounted equipment.

(3): In the above-described aspect (2), the equipment determiner determines that the in-vehicle equipment in which the communication with the communicator has been interrupted is communication interruption equipment that is the in-vehicle equipment but is communication interruption equipment incapable of performing communication, and updates the in-vehicle equipment information by associating communication state information indicating that the communication has been interrupted with the mounting presence or absence information of the mounted equipment determined to be the communication interruption equipment.

(4): In the above-described aspect (3), the in-vehicle equipment setup device further includes: a voice manipulator configured to manipulate at least one piece of the in-vehicle equipment in accordance with voice uttered by the user; and a notifier configured to notify the user of a state of a manipulation for the in-vehicle equipment, wherein the voice manipulator performs a manipulation corresponding to voice of a manipulation on the in-vehicle equipment that is the mounted equipment as indicated in the mounting presence or absence information included in the in-vehicle equipment information when the user has uttered the voice, and causes the notifier to provide the notification indicating that the in-vehicle equipment cannot be manipulated when the user utters the voice of the manipulation on the in-vehicle equipment that is the unmounted equipment or the communication interruption equipment as indicated in the mounting presence or absence information included in the in-vehicle equipment information.

(5): According to an aspect of the present invention, there is provided an in-vehicle equipment setup method including: determining, by a computer of an in-vehicle equipment setup device for performing a setup for operating each of a plurality of pieces of in-vehicle equipment mounted in a vehicle, whether the in-vehicle equipment included in at least in-vehicle equipment information in which mounting presence or absence information indicating whether or not the in-vehicle equipment has been mounted is shown stored in a storage is mounted equipment, which is the in-vehicle equipment mounted in the vehicle, or unmounted equipment, which is the in-vehicle equipment not mounted in the vehicle; updating, by the computer, the mounting presence or absence information included in the in-vehicle equipment information based on a result of determining the mounted equipment and the unmounted equipment; and performing, by the computer, a setup indicated in the setup information indicated in the user setup information of the user that has been selected within user setup information in which setup information about a setup of the in-vehicle equipment desired by a user of the vehicle is shown for each user stored in the storage with respect to the in-vehicle equipment that is the mounted equipment as indicated in the mounting presence or absence information included in the in-vehicle equipment information.

(6): According to an aspect of the present invention, there is provided a non-transitory computer-readable storage medium storing a program for causing a computer of an in-vehicle equipment setup device for performing a setup for operating each of a plurality of pieces of in-vehicle equipment mounted in a vehicle to: determine whether the in-vehicle equipment included in at least in-vehicle equipment information in which mounting presence or absence information indicating whether or not the in-vehicle equipment has been mounted is shown stored in a storage is mounted equipment, which is the in-vehicle equipment mounted in the vehicle, or unmounted equipment, which is the in-vehicle equipment not mounted in the vehicle; update the mounting presence or absence information included in the in-vehicle equipment information based on a result of determining the mounted equipment and the unmounted equipment; and perform a setup indicated in the setup information indicated in the user setup information of the user that has been selected within user setup information in which setup information about a setup of the in-vehicle equipment desired by a user of the vehicle is shown for each user stored in the storage with respect to the in-vehicle equipment that is the mounted equipment as indicated in the mounting presence or absence information included in the in-vehicle equipment information.

According to the above-described aspects (1) to (6), an in-vehicle equipment setup device, an in-vehicle equipment setup method, and a storage medium capable of suitably performing a setup of in-vehicle equipment for each user by the application can be provided.

DETAILED DESCRIPTION OF THE INVENTION

Hereinafter, embodiments of an in-vehicle equipment setup device, an in-vehicle equipment setup method, and a storage medium of the present invention will be described with reference to the drawings. As used throughout this disclosure, the singular forms "a," "an," and "the" include plural reference unless the context clearly dictates otherwise.

Figure 1:
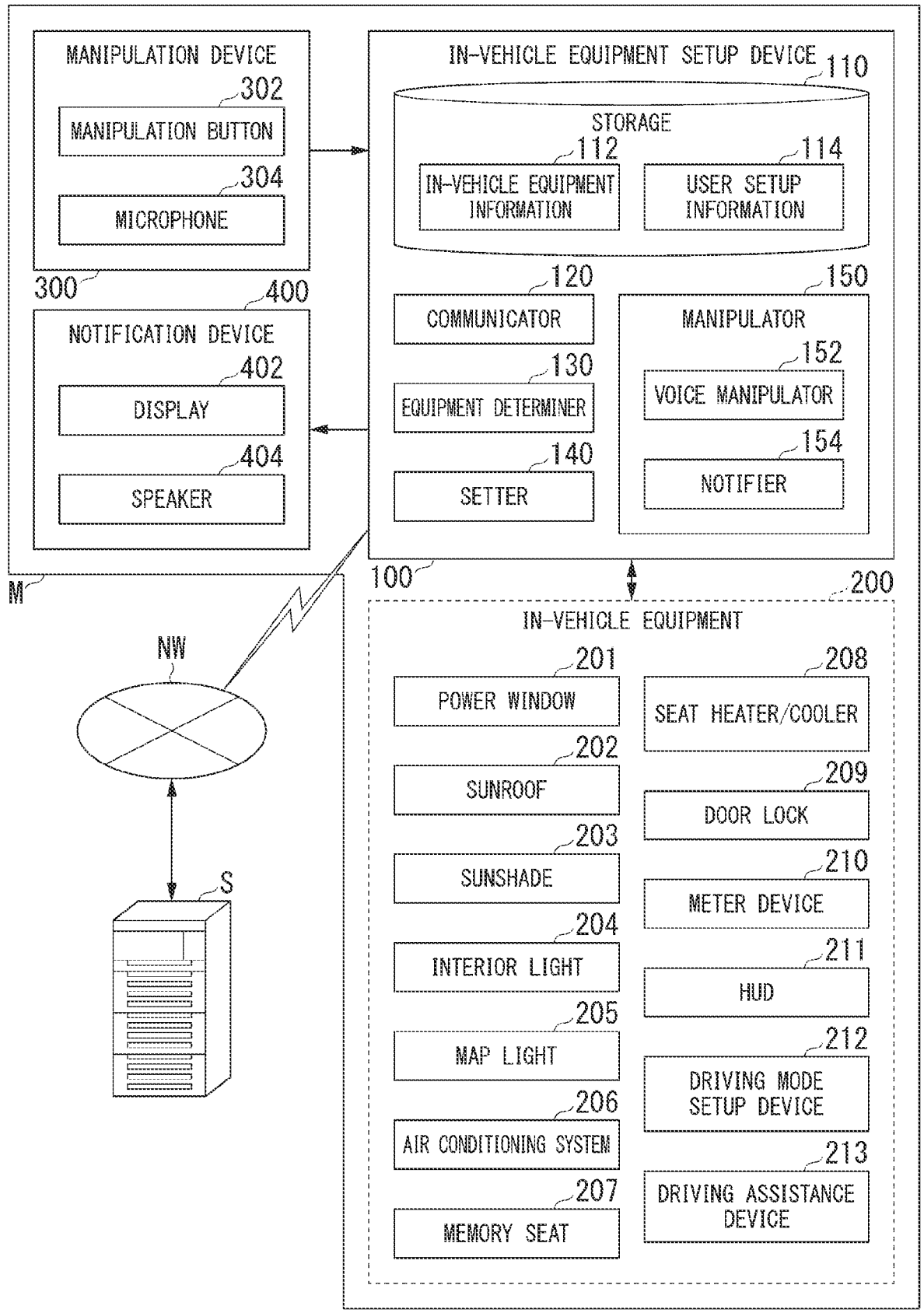
FIG. 1 is a diagram showing an example of a configuration of an in-vehicle equipment setup device and a usage environment according to an embodiment.

FIG. 1 is a diagram showing an example of a configuration of an in-vehicle equipment setup device and a usage environment according to the embodiment. An in-vehicle equipment setup device 100 is a device for setting up or controlling various types of in-vehicle equipment 200 mounted in a vehicle M. In FIG. 1, a power window 201, a sunroof 202, a sunshade 203, an interior light 204, a map light 205, an air conditioning system 206, a memory seat 207, a seat heater/cooler 208, a door lock 209, a meter device 210, a head-up display (HUD) 211, a driving mode setup device 212, and a driving assistance device 213 are shown as examples of the in-vehicle equipment 200. The in-vehicle equipment 200 mounted in the vehicle M is not limited to the in-vehicle equipment 200 shown in FIG. 1. That is, in-vehicle equipment other than the above-described in-vehicle equipment 200 may be included. In the following description, when one or more pieces of the individual in-vehicle equipment shown in the in-vehicle equipment 200 in FIG. 1 are not distinguished, they are simply referred to as the "in-vehicle equipment 200."

In the power window 201, for example, an operation of opening and closing the window glass arranged on the left and right sides of the driver's side, the passenger side, and the rear seat of the vehicle M is set up or controlled by the in-vehicle equipment setup device 100. In the sunroof 202, for example, an operation of opening and closing the glass or iron plate of an opening arranged in a ceiling portion of the cabin of the vehicle M or the like is set up or controlled by the in-vehicle equipment setup device 100. In the sunshade 203, for example, an operation of opening and closing a light shielding portion that blocks sunlight incident from a rear window glass portion of the vehicle M or left and right window glass portions of a rear seat is set up or controlled by the in-vehicle equipment setup device 100. In each of the interior light 204 and the map light 205, for example, ON, OFF, ON-time-specific luminance, and the like of illumination equipment in the cabin of the vehicle M are set up or controlled by the in-vehicle equipment setup device 100. In the air conditioning system 206, for example, a temperature, an air volume, and the like in the air conditioning device such as an air conditioner are set up or controlled by the in-vehicle equipment setup device 100. In the memory seat 207, for example, the position of the seat of the driver's seat side is set up or controlled by the in-vehicle equipment setup device 100 so that the position becomes a user-desired position (so-called seat position) when the vehicle M is driven such as a position and height of a seat surface or an angle of a backrest. In the seat heater/cooler 208, for example, a temperature adjustment function provided in the seat on the driver's seat side (or a passenger seat side or a rear seat) is set up or controlled by the in-vehicle equipment setup device 100. In the door lock 209, for example, an operation of a security function to be operated when the user gets off the vehicle M and leaves is set up or controlled by the in-vehicle equipment setup device 100. In each of the meter device 210 and the HUD 211, for example, each display item is set up or controlled by the in-vehicle equipment setup device 100 so that information desired by the user is displayed. In the driving mode setup device 212, for example, various items related to driving of the vehicle M are set up or controlled by the in-vehicle equipment setup device 100 so that a running mode desired by a user when driving the vehicle M becomes a normal running mode, a sports running mode, a comfort running mode, or the like. In the driving assistance device 213, for example, various items related to the driving mode of the vehicle M are set up or controlled by the in-vehicle equipment setup device 100 so that the driving mode of automated driving or driving assistance becomes the driving mode desired by the user.

The in-vehicle equipment setup device 100 sets up or controls the in-vehicle equipment 200 by executing an operating system (OS) or application shared by a plurality of vehicles acquired by communicating with a server device S via a network NW. The network NW includes, for example, some or all of the Internet, a cellular network, a Wi-Fi network, a wide area network (WAN), a local area network (LAN), a public circuit, a telephone circuit, a radio base station, and the like. A plurality of server devices S are connected to the network NW, and the in-vehicle equipment setup device 100 may acquire an application indicated by the user of the vehicle M from any server device S via the network NW to execute the application.

The in-vehicle equipment setup device 100 sets up or controls the in-vehicle equipment 200 in accordance with a manipulation on the manipulation device 300 by the user. In FIG. 1, an example in which each of a manipulation button 302 and a microphone 304 is provided as the manipulation device 300 is shown. The manipulation button 302 is, for example, a button or a switch arranged in close proximity to the in-vehicle equipment 200, and the in-vehicle equipment 200 is operated when it is manipulated (for example, pressed) by the user. The manipulation button 302 outputs information indicating a state of a manipulation by the user to the in-vehicle equipment setup device 100. For example, the microphone 304 is a sound collection device arranged at any position in a forward direction when the user is driving and configured to collect a sound produced in the cabin. The in-vehicle equipment 200 is operated when the user speaks vocally. A plurality of microphones 304 may be arranged at positions different from each other, for example, in the cabin of the vehicle M. The microphone 304 outputs information indicating the collected sound of the user and the cabin of the vehicle M to the in-vehicle equipment setup device 100. In the following description, it is assumed that the microphone 304 outputs information indicating the voice spoken by the user to the in-vehicle equipment setup device 100.

The in-vehicle equipment setup device 100 notifies the user of information about setting up or controlling the in-vehicle equipment 200 with the notification device 400. In FIG. 1, an example in which a display 402 and a speaker 404 are provided as the notification device 400 is shown. The display 402 includes, for example, a display device such as a liquid crystal display (LCD) located in the center console near the center of the vehicle M in a vehicle width direction or at the top of a dashboard, and visually notifies the user of information about setting up or controlling the in-vehicle equipment 200 by displaying a notification image output by the in-vehicle equipment setup device 100. The display 402 is configured as, for example, a touch panel, and also displays a manipulation image for receiving a manipulation equivalent to a manipulation on the manipulation button 302. The speaker 404 is, for example, a sound production device such as a buzzer or a speaker, and notifies the user of information about setting up or controlling the in-vehicle equipment 200 using a sound by producing a sound of sound information such as a sound signal or sound data output by the in-vehicle equipment setup device 100.

Configuration of In-Vehicle Equipment Setup Device

The in-vehicle equipment setup device 100 includes, for example, a storage 110, a communicator 120, an equipment determiner 130, a setter 140, and a manipulator 150. The manipulator 150 includes, for example, a voice manipulator 152 and a notifier 154.

The equipment determiner 130, the setter 140, and the manipulator 150 include, for example, a hardware processor such as a central processing unit (CPU) and a storage device (a storage device including a non-transient storage medium) storing a program (software). Functions of the components are implemented by the processor executing the program. Also, some or all of these components may be implemented by hardware (including a circuit; circuitry) such as a large-scale integration (LSI) circuit, an application-specific integrated circuit (ASIC), a field-programmable gate array (FPGA), or a graphics processing unit (GPU) or may be implemented by software and hardware in cooperation. Some or all of the functions of these components may be implemented by a dedicated LSI. Here, the program (software) may be stored in advance in a storage device (a storage device having a non-transitory storage medium) that constitutes a semiconductor memory device such as a read-only memory (ROM), a random-access memory (RAM), or a flash memory or a storage device such as a hard disk drive (HDD) provided in the in-vehicle equipment setup device 100. Alternatively, the program (software) may be stored in a removable storage medium (a non-transitory storage medium) such as a DVD or CD-ROM and installed in a storage device provided in the in-vehicle equipment setup device 100 when the storage medium is mounted in a drive device provided in the in-vehicle equipment setup device 100. The program (software) may be downloaded from another computer device via the network and installed in the storage device provided in the in-vehicle equipment setup device 100. For example, the program (software) is stored at the time when the storage device is in a state of a separate item, such as a stage before it is mounted in the vehicle M, and therefore the program (software) may be installed in the storage device provided in the in-vehicle equipment setup device 100 when the storage device is attached to the vehicle M.

In the following description, it is assumed that the configuration of the equipment determiner 130, the setter 140, and the manipulator 150 executes an operating system or an application shared by a plurality of vehicles including the vehicle M and therefore the in-vehicle equipment 200 provided in the vehicle M is set up or controlled. In the following description, it is assumed that an operating system or an application (hereinafter referred to as "in-vehicle equipment application") shared by a plurality of vehicles acquired from the server device S via the network NW is stored when the storage device is in a state of a separate item, and the storage device is installed in the vehicle M. In other words, in the in-vehicle equipment application, it is assumed that it has not been confirmed what type of in-vehicle equipment 200 is mounted in the vehicle M, which in-vehicle equipment can be controlled, and the like.

For example, the storage 110 stores in-vehicle equipment information 112 and user setup information 114. The in-vehicle equipment information 112 is information (a list) indicating in-vehicle equipment that can be set up or controlled by an in-vehicle equipment application. The in-vehicle equipment information 112 includes information indicating various types of in-vehicle equipment including the in-vehicle equipment 200 mounted in the vehicle M. That is, the in-vehicle equipment information 112 is information in which information indicating the presence or absence of mounting in the vehicle M (hereinafter referred to as "mounting presence or absence information") is associated with all in-vehicle equipment that can be set up or controlled by the in-vehicle equipment application. In the initial state of the in-vehicle equipment information 112, only the list of in-vehicle equipment is stored and the mounting presence or absence information is not stored. The user setup information 114 is information that includes information related to the setup desired by the user for the in-vehicle equipment 200 provided in the vehicle M (hereinafter referred to as "setup information"). The user setup information 114 is stored in the storage 110, for example, when the user registers himself or herself in the in-vehicle equipment setup device 100 as a user who uses the vehicle M. When a plurality of users using the vehicle M are registered, setup information for each user is stored in the user setup information 114.

The communicator 120 performs communication with the server device S via the network NW and communication with the in-vehicle equipment 200 provided in the vehicle M. The communicator 120 includes a communication interface such as a network card for communicating with the server device S via the network NW and a communication interface for communicating with the in-vehicle equipment 200 provided in the vehicle M such as, for example, a multiplex communication line such as a controller area network (CAN) communication line, a serial communication line, or a wireless communication network. In the following description, it is assumed that the communicator 120 communicates with the in-vehicle equipment 200 through CAN communication.

The equipment determiner 130 determines the in-vehicle equipment 200 mounted in the vehicle M on the basis of a state of CAN communication between the communicator 120 and the in-vehicle equipment 200. More specifically, when CAN communication with the in-vehicle equipment 200 is established in the communicator 120, the equipment determiner 130 determines that the in-vehicle equipment 200, which communicates with the communicator 120 through the CAN communication, is in-vehicle equipment 200 (hereinafter referred to as "mounted equipment") mounted in the vehicle M. In other words, the equipment determiner 130 determines that in-vehicle equipment, which is included in the list of the in-vehicle equipment information 112 but does not perform CAN communication with the communicator 120, is in-vehicle equipment (hereinafter referred to as "unmounted equipment") that is not mounted in the vehicle M. The equipment determiner 130 updates the in-vehicle equipment information 112 stored in the storage 110 using a discrimination result as mounting presence or absence information. That is, the equipment determiner 130 causes the in-vehicle equipment information 112 to store the mounting presence or absence information indicating whether it is mounted equipment or unmounted equipment.

Meanwhile, for example, in the case where the in-vehicle equipment 200 fails or the like, the in-vehicle equipment 200, which has failed, can be considered to be equivalent to unmounted equipment. In this case, when it is determined that the in-vehicle equipment 200 is unmounted equipment due to a failure, the equipment determiner 130 updates the in-vehicle equipment information 112 stored in the storage 110 by designating a discrimination result thereof as the mounting presence or absence information.

Further, for example, it is also conceivable that CAN communication is established once but CAN communication between the communicator 120 and the in-vehicle equipment 200 is interrupted due to some factor (including a failure) thereafter. In this case, the equipment determiner 130 does not determine that the in-vehicle equipment 200 in which CAN communication has been interrupted is unmounted equipment, but determines that it is in-vehicle equipment 200 (hereinafter referred to as "communication interruption equipment") in which CAN communication has been interrupted. When it is determined that any in-vehicle equipment 200 determined to be the mounted equipment has become communication interruption equipment, the equipment determiner 130 updates the in-vehicle equipment information 112 stored in the storage 110 using the discrimination result as communication state information. That is, the equipment determiner 130 causes the in-vehicle equipment information 112 to store the communication state information indicating whether it is communicative equipment or communication interruption equipment.

The setter 140 sets up the in-vehicle equipment 200 on the basis of the in-vehicle equipment information 112 stored in the storage 110. More specifically, the setter 140 sets up the in-vehicle equipment 200 indicated to be mounted equipment in the mounting presence or absence information included in the in-vehicle equipment information 112. Here, a value of a setup to be initially performed by the setter 140 for the in-vehicle equipment 200 is an initial value. The setup of the initial value in the setter 140 is performed when the in-vehicle equipment setup device 100 is activated for the first time or when the user of the vehicle M is not registered. On the other hand, when the user setup information 114 is stored in the storage 110, the setter 140 sets up the setup value indicated in the setup information included in the user setup information 114 of the user boarding the vehicle M this time in the in-vehicle equipment 200. The user boarding the vehicle M this time may be, for example, a user associated with a wireless communication type portable key such as a smart key or a user selected from a plurality of users displayed on the display 402 (a user who performed a registration process in the in-vehicle equipment setup device 100 in the past). Here, although a plurality of users are displayed on the display 402 so that something or someone is prompted to perform selection, for example, when a user who does not normally use the vehicle M, such as a "guest user," is selected, the setter 140 may set up an initial value in the in-vehicle equipment 200 or may not make a change from a setup value of the user that has previously used the vehicle M.

When the user manipulates the manipulation device 300 and therefore an instruction to manipulate any in-vehicle equipment 200 is issued, the manipulator 150 causes the in-vehicle equipment 200 to perform an operation indicated in the instruction from the user. For example, the manipulator 150 causes the corresponding in-vehicle equipment 200 to operate in response to a manipulation on the manipulation button 302 by the user. The manipulator 150 provides a notification of a state of a manipulation for the in-vehicle equipment 200 by the user.

When the user issues an instruction to manipulate any in-vehicle equipment 200 by voice, the voice manipulator 152 causes the in-vehicle equipment 200 to perform an operation indicated in the instruction from the user. The voice manipulator 152 controls the operation of the in-vehicle equipment 200, which has received the manipulation, by receiving the manipulation based on the user's voice on at least one piece of the in-vehicle equipment 200. More specifically, the voice manipulator 152 acquires the user's utterance collected by the microphone 304 and recognizes in-vehicle equipment 200 designated by the user or an instruction of the manipulation on the in-vehicle equipment 200 from content of the utterance. The recognition of the instruction content for the in-vehicle equipment 200 in the voice manipulator 152 may be performed, for example, with a voice recognition function (not shown) provided in the voice manipulator 152, or may be performed with a voice recognition function (not shown) provided in the server device S. When the recognition of the instruction content is performed by the voice recognition function (not shown) provided in the server device S, the voice manipulator 152 causes the communicator 120 to transmit data of the user's voice collected by the microphone 304 to the server device S via the network NW. The communicator 120 receives data of a recognition result (instruction content) transmitted from the server device S via the network NW and outputs the data to the voice manipulator 152. It is only necessary to configure the voice recognition function (not shown) of obtaining a result (instruction content) by performing voice processing including recognition of the user's voice collected by the microphone 304 and determination of the manipulation indicated in the recognized voice. A part or all of a voice recognition function (not shown) may be implemented by artificial intelligence (AI) technology. The voice manipulator 152 controls an operation of the target in-vehicle equipment 200 in accordance with the recognized instruction content.

At this time, the voice manipulator 152 performs a manipulation on the in-vehicle equipment 200 indicated to be mounted equipment in the mounting presence or absence information included in the in-vehicle equipment information 112. At this time, the voice manipulator 152 outputs information indicating that an instruction to manipulate the mounted equipment has been given to the notifier 154. However, when the user manipulates the in-vehicle equipment 200 by voice, an instruction to manipulate in-vehicle equipment not mounted in the vehicle M, in-vehicle equipment 200 that has failed, and in-vehicle equipment 200 in which CAN communication has been interrupted is also conceivable. In this case, the voice manipulator 152 outputs information indicating that it is impossible to receive a manipulation on the in-vehicle equipment 200 (including in-vehicle equipment not mounted in the vehicle M) indicated in the instruction to the notifier 154. More specifically, when the user's voice instruction is an instruction for the in-vehicle equipment 200 indicated to be unmounted equipment or communication interruption equipment in the mounting presence or absence information included in the in-vehicle equipment information 112, the voice manipulator 152 outputs information indicating that a manipulation instruction has been given to the unmounted equipment or the communication interruption equipment to the notifier 154.

The notifier 154 notifies the user of a state of a manipulation on the in-vehicle equipment 200 in response to an instruction given by the user with respect to the manipulation device 300 on the basis of information indicating that a manipulation instruction has been given to the in-vehicle equipment 200 output by the voice manipulator 152. More specifically, when the manipulation indicated in the instruction through the manipulation button 302 or the microphone 304 by the user is for the mounted equipment, the notifier 154 notifies the user of an operation state of the in-vehicle equipment 200 indicated in the instruction by causing the display 402 to display a notification image indicating the operation state of the mounted equipment or causing the speaker 404 to produce a sound of voice information indicating the operation state of the mounted equipment. On the other hand, when the manipulation indicated in the instruction through the manipulation button 302 or the microphone 304 by the user is for unmounted equipment or communication interruption equipment, the notifier 154 notifies the user that it is impossible to receive the manipulation when an instruction is issued to in-vehicle equipment 200 incapable of being manipulated by causing the display 402 to display a notification image indicating that it is impossible to manipulate the in-vehicle equipment 200 indicated in the instruction (a manipulation is impossible) or causing the speaker 404 to produce a sound of voice information indicating that a manipulation on the in-vehicle equipment 200 indicated in the instruction is impossible. Thereby, the user can visually and/or audibly recognize a state of a manipulation for the in-vehicle equipment 200 indicated in the instruction.

Example of Process of Updating In-Vehicle Equipment Information in In-Vehicle Equipment Setup Device Next, an example of the flow of a process in which the in-vehicle equipment setup device 100 updates in-vehicle equipment information 112 will be described.

Figure 2:
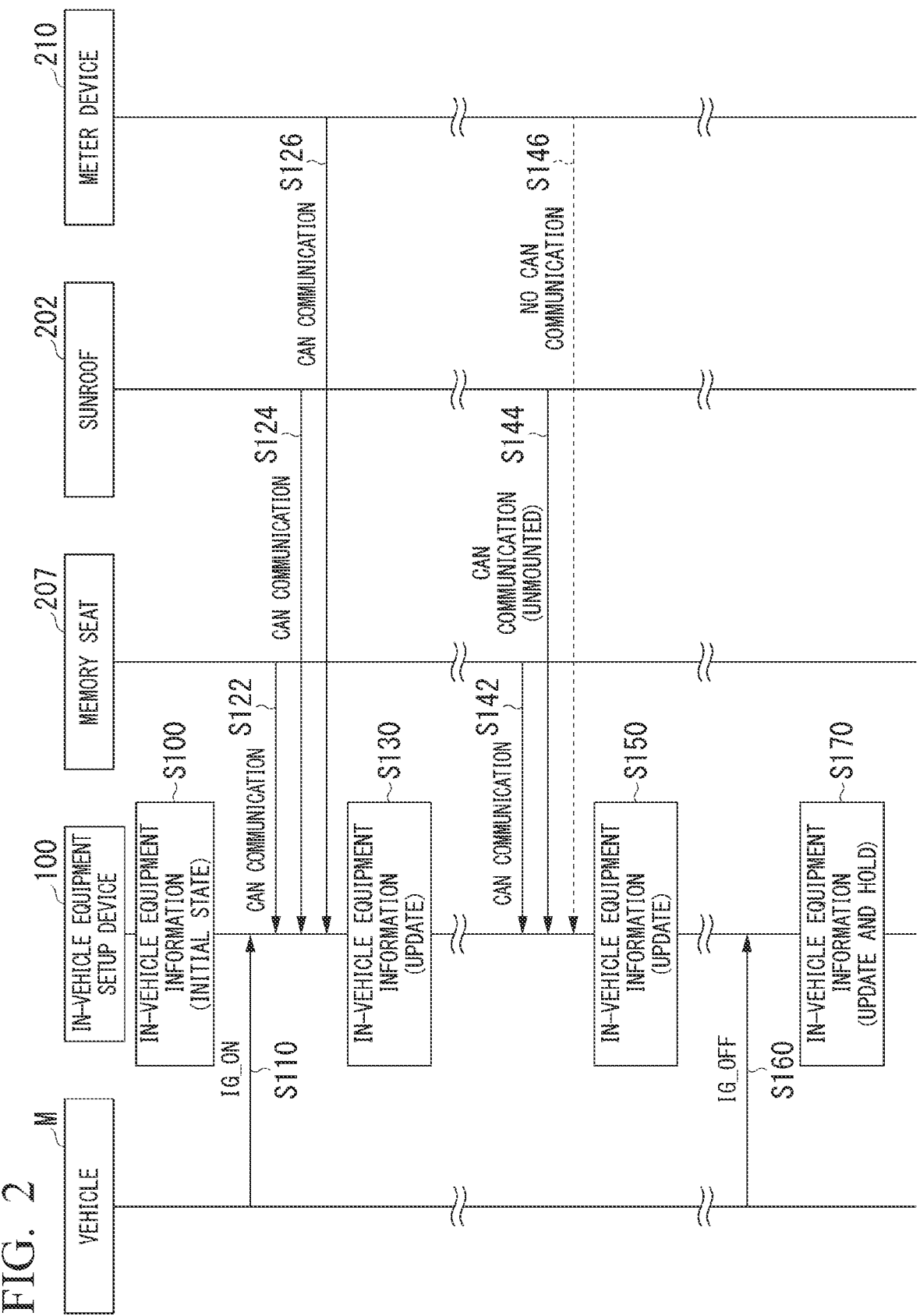
FIG. 2 is a sequence diagram showing an example of the flow of a process of updating in-vehicle equipment information in the in-vehicle equipment setup device of the embodiment.

FIG. 2 is a sequence diagram showing an example of the flow of a process of updating the in-vehicle equipment information 112 in the in-vehicle equipment setup device 100 of the embodiment. In FIG. 2, the memory seat 207, the sunroof 202, and the meter device 210 are each mounted in the vehicle M as the in-vehicle equipment 200, and an example of a manipulation on the vehicle M, an operation (process) of the in-vehicle equipment setup device 100, and the exchange of information (data) in CAN communication performed between the components is shown.

Figure 3:
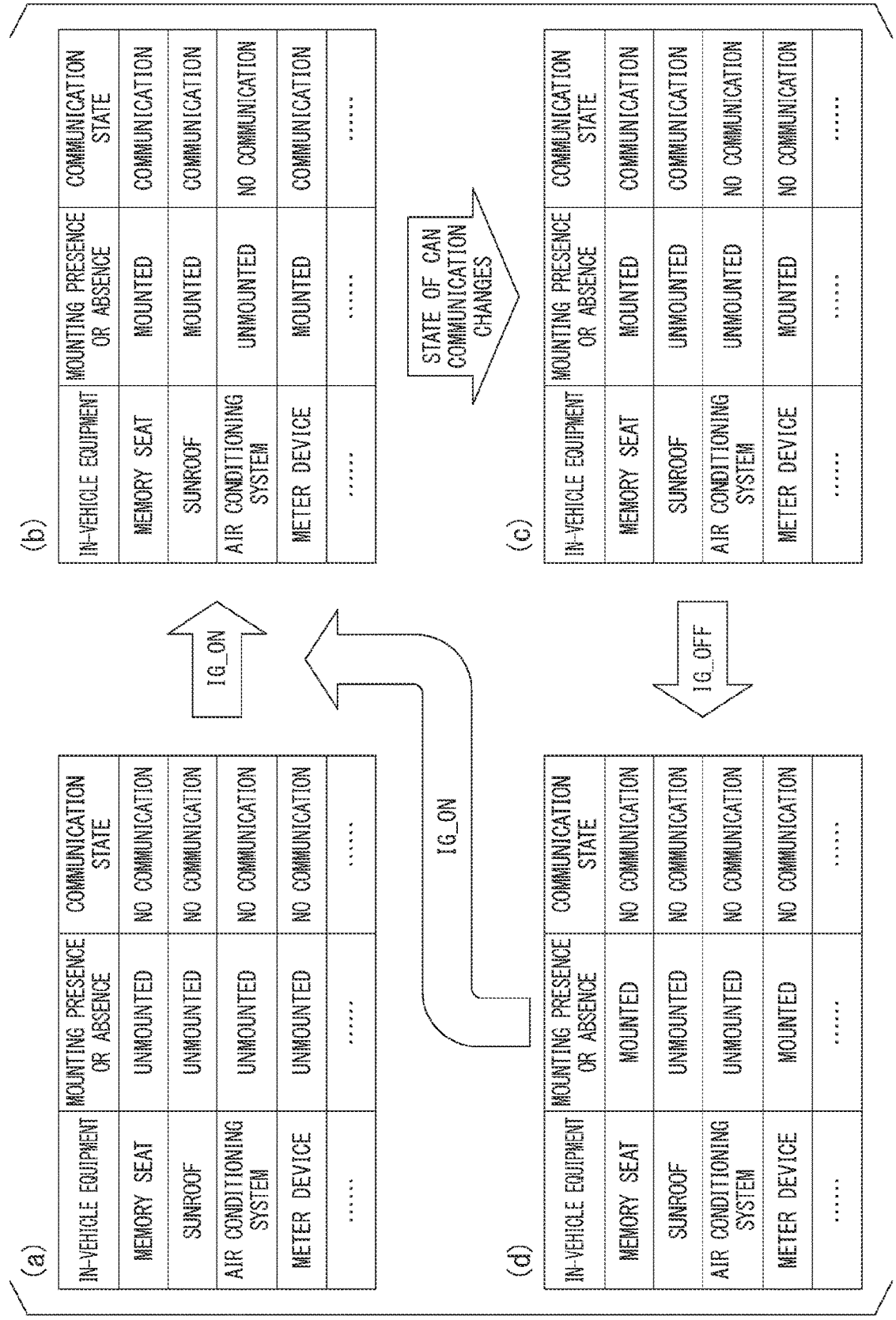
FIG. 3 is a diagram showing an example of in-vehicle equipment information updated by the in-vehicle equipment setup device of the embodiment.

FIG. 3 is a diagram showing an example of the in-vehicle equipment information 112 updated by the in-vehicle equipment setup device 100 of the embodiment. Each of FIGS. 3(a) to 3(d) shows an example of the in-vehicle equipment information 112 at each stage of the process of the in-vehicle equipment setup device 100 shown in FIG. 2. In the process of the in-vehicle equipment setup device 100 shown in FIG. 2, the following description will be given with reference to an example of the in-vehicle vehicle equipment information 112 shown in FIG. 3 as appropriate.

In the following description, when the storage device (for example, which may be used as the storage 110) provided in the in-vehicle equipment setup device 100 is in a state of a separate item before it is installed in the vehicle M, it is assumed that a shared general-purpose in-vehicle equipment application is stored. That is, in the initial state of the in-vehicle equipment setup device 100, it is assumed that the in-vehicle equipment 200 to be set up or controlled has not been confirmed in the in-vehicle equipment application.

When activated, the in-vehicle equipment setup device 100 first executes an in-vehicle equipment application stored in the storage device. Thereby, the in-vehicle equipment setup device 100 causes the storage 110 to store the in-vehicle equipment information 112 of the initial state as shown in FIG. 3(*a*) (step S100). In step S100, a process of storing the in-vehicle equipment information 112 of the initial state in the storage 110 is a process performed when the in-vehicle equipment application is executed for the first time in the in-vehicle equipment setup device 100. That is, the processing of step S100 is not performed when an in-vehicle equipment application is executed in the subsequent process (each process to be described below). FIG. 3(*a*) shows an example of the in-vehicle equipment information 112 of the initial state in which a list of in-vehicle equipment such as the memory seat 207, the sunroof 202, the air conditioning system 206, and the meter device 210 capable of being set up or controlled by the in-vehicle equipment application is shown as information of the in-vehicle equipment. Also, in the in-vehicle equipment information 112 of the initial state, as shown in FIG. 3(*a*), the mounting presence or absence information of any in-vehicle equipment is "unmounted" and the communication state information of any in-vehicle equipment is "no communication (no CAN communication)." Here, the air conditioning system 206 was mounted in the vehicle M as in-vehicle equipment in FIG. 1. However, in the process of updating the in-vehicle equipment information 112 in the in-vehicle equipment setup device 100 described with reference to FIGS. 2 and 3, for example, it is assumed that the temperature setup in the air conditioning system 206 is a dial type or the like and the temperature inside of the vehicle cannot be set up according to a value (i.e., the in-vehicle equipment application does not have a function necessary for performing the setup and control).

"Mounted" in the in-vehicle equipment information 112 shown in FIG. 3 is an example of information indicating "mounted equipment" and "unmounted" is an example of information indicating "unmounted equipment." "Communication" in the in-vehicle equipment information 112 shown in FIG. 3 is an example of information indicating that CAN communication is not interrupted and "no communication" is an example of information indicating that CAN communication is interrupted.

Thereafter, for example, an ignition switch (not shown) (which may be an ignition key) is turned on (IG_ON) by the user boarding the vehicle M (step S110). Thereby, each component of the electrical system including the in-vehicle equipment 200 provided in the vehicle M is activated and CAN communication is started (established) between the in-vehicle equipment 200 and the communicator 120. In FIG. 2, a case where CAN communication is performed between the communicator 120 and the memory seat 207 (step S122), CAN communication is performed between the communicator 120 and the sunroof 202 (step S124), and CAN communication is performed between the communicator 120 and the meter device 210 (step S126) is shown. The in-vehicle equipment 200, for example, may transmit information indicating that it is mounted in the vehicle M to the communicator 120 through CAN communication.

The equipment determiner 130 determines whether it is mounted equipment or unmounted equipment for all in-vehicle equipment included in a list of in-vehicle equipment information 112 on the basis of a state of CAN communication between the communicator 120 and the in-vehicle equipment 200 and updates the in-vehicle equipment information 112 on the basis of a discrimination result (step S130). In FIG. 3(*b*), an example of the in-vehicle equipment information 112 in which the mounting presence or absence information and the communication state information are updated with respect to the in-vehicle equipment information 112 of the initial state shown in FIG. 3(*a*) is shown. More specifically, in the updated in-vehicle equipment information 112 shown in FIG. 3(*b*), an example of the in-vehicle equipment information 112 in which the mounting presence or absence information corresponding to each of the memory seat 207 in which CAN communication has been performed in step S122, the sunroof 202 in which CAN communication has been performed in step S124, and the meter device 210 in which CAN communication has been performed in step S126 is updated to "mounted" and the communication state information is updated to "communication (CAN communication)" is shown.

Thereafter, if the operation of the in-vehicle equipment 200 is indicated in an instruction when the manipulation device 300 is manipulated by the user boarding the vehicle M this time and a user thereof is registered, the in-vehicle equipment setup device 100 causes the storage 110 to store the user setup information 114 including the setup information of the in-vehicle equipment 200. The registration of the user and the storage of the user setup information 114 in the storage 110 may be performed by the setter 140. It is only necessary for the user registration method in the in-vehicle equipment setup device 100 or the setter 140, the storage method of the user setup information 114, and the configuration of the user setup information 114 including the setup information to be equivalent to the existing registration method, the existing storage method, and the existing configuration of the user setup information 114. Therefore, a detailed description of the user registration method in the in-vehicle equipment setup device 100 or the setter 140, the storage method of the user setup information 114, and the configuration of the user setup information 114 will be omitted.

Thereafter, while the ignition switch (not shown) is turned on, CAN communication between the communicator 120 and the in-vehicle equipment 200 is periodically performed at a predetermined time interval. Here, in the sequence diagram shown in FIG. 2, for example, it is assumed that the state of CAN communication changes while the vehicle M is running. In FIG. 2, a case where CAN communication between the communicator 120 and the memory seat 207 is normally performed (step S142), but the CAN communication between the communicator 120 and the sunroof 202 (step S144) and the CAN communication between the communicator 120 and the meter device 210 (step S146) are abnormal is shown. More specifically, a case where information indicating that it is not mounted in the vehicle M is transmitted from the sunroof 202 in step S144 and CAN communication between the meter device 210 and the communicator 120 is interrupted in step S146 is shown.

The equipment determiner 130 determines the state of the in-vehicle equipment 200 on the basis of the state of CAN communication between the communicator 120 and the in-vehicle equipment 200 and updates the in-vehicle equipment information 112 stored in the storage 110 (step S150). In FIG. 3(*c*), an example of the in-vehicle equipment information 112 in which the mounting presence or absence information and the communication state information are updated on the basis of the state of CAN communication with respect to the in-vehicle equipment information 112 shown in FIG. 3(b) is shown. More specifically, in the updated in-vehicle equipment information 112 shown in FIG. 3(c), an example of the in-vehicle equipment information 112 in which the mounting presence or absence information corresponding to the sunroof 202 to which information indicating that it is not mounted in the vehicle M is transmitted in step S144 is updated to "unmounted" is shown. This is because the equipment determiner 130 determines, for example, that the sunroof 202 has failed and has become equivalent to the unmounted equipment due to the transmission of information indicating that it is not mounted in the vehicle M from the sunroof 202. On the other hand, in the updated in-vehicle equipment information 112 shown in FIG. 3(c), an example of the in-vehicle equipment information 112 in which the communication state information corresponding to the meter device 210 in which CAN communication has been interrupted in step S146 is updated to "no communication" is shown. This is because the CAN communication between the meter device 210 and the communicator 120 has been interrupted, but information indicating that it is not mounted in the vehicle M has not been transmitted from the meter device 210 and therefore the equipment determiner 130, for example, determines that it is communication interruption equipment in which CAN communication has been temporarily interrupted instead of unmounted equipment due to a failure.

Meanwhile, a case where the user issues an instruction to change the operation of the in-vehicle equipment 200 by manipulating the manipulation device 300 when the in-vehicle equipment information 112 is in the state shown in FIG. 3(c) is also conceivable. At this time, when an instruction has been given to the memory seat 207 in which the mounting presence or absence information is "mounted" and the communication state information is "communication," the manipulator 150 changes a current position (seat position) of the memory seat 207 to a position corresponding to content of the instruction from the user. On the other hand, when an instruction has been given to the sunroof 202 in which the mounting presence or absence information is updated to "unmounted" or the meter device 210 in which the communication state information is updated to "no communication," the manipulator 150 notifies the user that the sunroof 202 and the meter device 210 cannot be manipulated by causing the display 402 to display a notification image and causing the speaker 404 to produce a sound of voice information with the notifier 154.

Thereafter, for example, the vehicle M arrives at the destination and the ignition switch (not shown) (which may be the ignition key) is turned off (IG_OFF) by the user on board (step S160). Thereby, the operation of each component of the electrical system including the in-vehicle equipment 200 provided in the vehicle M is ended and the CAN communication (including the interrupted CAN communication) established between the in-vehicle equipment 200 and the communicator 120 is ended. Thereby, the equipment determiner 130 determines the in-vehicle equipment 200 as communication interruption equipment in which CAN communication has been interrupted.

The equipment determiner 130 determines the state of the in-vehicle equipment 200 on the basis of the state of CAN communication between the communicator 120 and the in-vehicle equipment 200 and updates and holds the in-vehicle equipment information 112 stored in the storage 110 (step S170). In FIG. 3(d), an example of the in-vehicle equipment information 112 in which the mounting presence or absence information and the communication state information are updated on the basis of the state of CAN communication with respect to the in-vehicle equipment information 112 shown in FIG. 3(c) when the ignition switch (not shown) is turned off is shown. More specifically, in the updated in-vehicle equipment information 112 shown in FIG. 3(d), an example of the in-vehicle equipment information 112 in which the communication state information corresponding to all in-vehicle equipment 200 is updated to "no communication" due to the fact that the ignition switch (not shown) is turned off in step S160 and the state of FIG. 3(c) is maintained in the mounting presence or absence information is shown. This is because the CAN communication with the communicator 120 has been interrupted in all in-vehicle equipment 200, but the equipment determiner 130 determines that all in-vehicle equipment 200 has become communication interruption equipment in which CAN communication has been temporarily interrupted.

Thereafter, the in-vehicle equipment setup device 100, for example, periodically iterates the processing of steps S110 to S150 when the ignition switch (not shown) (which may be the ignition key) is turned on (IG_ON) by a user boarding the vehicle M and performs the processing of step S170 again when the ignition switch (not shown) (which may be the ignition key) is turned off (IG_OFF). For this reason, the equipment determiner 130 updates the mounting presence or absence information and the communication state information to the in-vehicle equipment information 112 held as shown in FIG. 3(d) on the basis of the state of the CAN communication between the communicator 120 and the in-vehicle equipment 200.

According to such a processing flow, the in-vehicle equipment setup device 100 causes the storage 110 to store the in-vehicle equipment information 112 of the initial state when the in-vehicle equipment application is executed for the first time and subsequently updates the in-vehicle equipment information 112 on the basis of a state of CAN communication that is periodically performed between the communicator 120 and the in-vehicle equipment 200. Thereby, the in-vehicle equipment application executed in the in-vehicle equipment setup device 100 can set up or control the in-vehicle equipment 200 in a state in which it is confirmed what type of in-vehicle equipment 200 is mounted in the vehicle M, which in-vehicle equipment can be controlled, and the like. In other words, when the user issues an instruction to manipulate the in-vehicle equipment 200, the in-vehicle equipment application can set up or control the in-vehicle equipment 200 without confirming whether or not the in-vehicle equipment 200 indicated in the instruction can be set up or controlled each time. This is effective for the user (convenience is improved) because the user can manipulate the in-vehicle equipment 200 more quickly and more suitably when the user manipulates the setup item of the in-vehicle equipment 200.

Another Example of Process of Updating In-Vehicle Equipment Information in In-Vehicle Equipment Setup Device In the process of updating the in-vehicle equipment information 112 in the in-vehicle equipment setup device 100 described with reference to FIGS. 2 and 3, the case where the equipment determiner 130 updates the mounting presence or absence information and the communication state information included in the in-vehicle equipment information 112 on the basis of a state of CAN communication between the communicator 120 and the in-vehicle equipment 200 has been described. Here, some of the in-vehicle equipment 200 can set up or control a plurality of functions. For this reason, the in-vehicle equipment information 112 may include information indicating a type of item (hereinafter referred to as a "setup item") that can be set up or controlled in the in-vehicle equipment (which may be the vehicle M itself) in addition to or instead of information (a list) indicating in-vehicle equipment that can be set up or controlled by an in-vehicle equipment application, mounting presence or absence information indicating whether or not in-vehicle equipment is mounted in the vehicle M, and communication state information indicating whether or not the in-vehicle equipment can be manipulated on the basis of a state of CAN communication. Hereinafter, in this case, an example of the flow of a process in which the in-vehicle equipment setup device 100 updates the in-vehicle equipment information 112 will be described.

Figure 4:
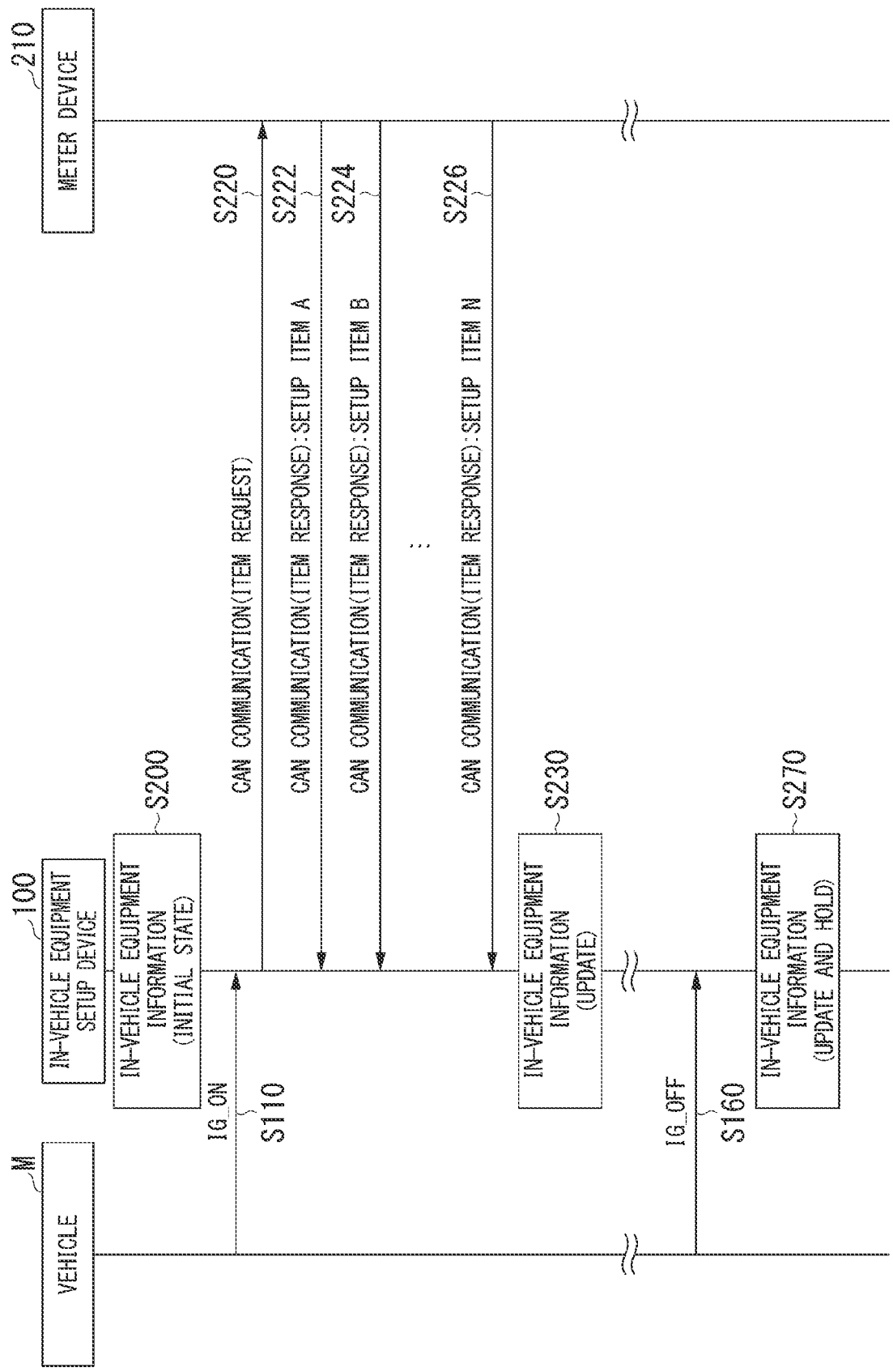
FIG. 4 is a sequence diagram showing an example of the flow of another process of updating in-vehicle equipment information in the in-vehicle equipment setup device of the embodiment.

FIG. 4 is a sequence diagram showing an example of the flow of another process in which the in-vehicle equipment information 112 is updated in the in-vehicle equipment setup device 100 of the embodiment. In the sequence diagram shown in FIG. 4, in CAN communication between the equipment determiner 130 and the in-vehicle equipment 200, an example of the flow of a process in which the in-vehicle equipment information 112 is updated when the equipment determiner 130 transmits a request of information of the setup item to the in-vehicle equipment 200 and the in-vehicle equipment 200 transmits a response of the information of the setup item in response to the request from the equipment determiner 130 is shown. In FIG. 4, the meter device 210 is mounted in the vehicle M as the in-vehicle equipment 200 and an example of the manipulation on the vehicle M, the operation (process) of the in-vehicle equipment setup device 100, and the exchange of information (data) in CAN communication between the components is shown. In the sequence diagram shown in FIG. 4, the same step number is assigned to processing similar to the processing of the sequence diagram shown in FIG. 2.

Figure 5:
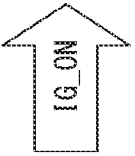
FIG. 5 is a diagram showing another example of in-vehicle equipment information updated by the in-vehicle equipment setup device of the embodiment.

FIG. 5 is a diagram showing another example of the in-vehicle equipment information 112 updated by the in-vehicle equipment setup device 100 of the embodiment. In FIG. 5, an example of the in-vehicle equipment information 112 including information (a list) indicating setup items that can be set up or controlled by the in-vehicle equipment application instead of the information of the in-vehicle equipment, which is information (a list) indicating in-vehicle equipment that can be set up or controlled by the in-vehicle equipment application is shown. In the following description, the in-vehicle equipment information 112 shown in FIG. 5 is referred to as "in-vehicle equipment information 112a" so that the in-vehicle equipment information 112 shown in FIG. 3 and the in-vehicle equipment information 112 shown in FIG. 5 are distinguished. In each of FIGS. 5(a) and 5(b), an example of in-vehicle equipment information 112a at each stage of the processing of the in-vehicle equipment setup device 100 shown in FIG. 4 is shown. In the following description, in the processing of the in-vehicle equipment setup device 100 shown in FIG. 4, an example of the in-vehicle equipment information 112a shown in FIG. 5 will be described with appropriate reference.

In the following description, an in-vehicle equipment application using the in-vehicle equipment information 112a is referred to as an "in-vehicle equipment application a" so that an in-vehicle equipment application capable of setting up or controlling the in-vehicle equipment 200 using the in-vehicle equipment information 112 as shown in FIG. 3 and an in-vehicle equipment application capable of setting up or controlling the setup item in the in-vehicle equipment 200 using the in-vehicle equipment information 112a as shown in FIG. 5 are distinguished. In the following description, when the storage device (for example, which may be used as the storage 110) provided in the in-vehicle equipment setup device 100 is in a state of a separate item before it is installed in the vehicle M, it is assumed that a shared general-purpose in-vehicle equipment application a is stored. That is, in the in-vehicle equipment application a, it is assumed that the setup items are not confirmed in the in-vehicle equipment 200 to be set up or controlled in the initial state of the in-vehicle equipment setup device 100.

When activated, the in-vehicle equipment setup device 100 first executes the in-vehicle equipment application a stored in the storage device. Thereby, the in-vehicle equipment setup device 100 causes in the storage 110 to store the in-vehicle equipment information 112a of the initial state as shown in FIG. 5(a) (step S200). A process of causing the storage 110 to store the in-vehicle equipment information 112a of the initial state in step S200 is also a process to be performed when the in-vehicle equipment application a is executed for the first time in the in-vehicle equipment setup device 100. That is, the processing of step S200 is not performed when the in-vehicle equipment application a is executed in the subsequent process (each process to be described below). FIG. 5(a) shows an example of the in-vehicle equipment information 112a of the initial state in which a list of setup items A to N capable of being set up or controlled by the in-vehicle equipment application a is shown as setup item information. Also, in the in-vehicle equipment information 112a of the initial state, as shown in FIG. 5(a), any setup item of the mounting presence or absence information is "unmounted" and any setup item of the communication state information is "no communication (no CAN communication)." In the in-vehicle equipment information 112a, "mounted" indicates that the in-vehicle equipment 200 capable of setting up or controlling the corresponding setup item is mounted and "unmounted" indicates that the in-vehicle equipment capable of setting up or controlling the corresponding setup item is unmounted. In the in-vehicle equipment information 112a, "communication" indicates that the corresponding setup item can be set up or controlled (i.e., a manipulation by the user is possible) and "no communication" indicates that the corresponding setup item cannot be set up or controlled (i.e., a manipulation by the user is impossible).

"Mounted" in the in-vehicle equipment information 112a shown in FIG. 5 is an example of information indicating "mounted equipment" and "unmounted" is also an example of information indicating "unmounted equipment." "Communication" in the in-vehicle equipment information 112a shown in FIG. 5 is an example of information indicating that CAN communication is not interrupted and "no communication" is also an example of information indicating that CAN communication is interrupted.

Thereafter, for example, the ignition switch (not shown) (which may be an ignition key) is turned on (IG_ON) by the user boarding the vehicle M (step S110). Thereby, each component of the electrical system including the in-vehicle equipment 200 provided in the vehicle M is activated and CAN communication is started (established) between the in-vehicle equipment 200 and the communicator 120.

The equipment determiner 130 causes the communicator 120 to transmit CAN communication (an item request) for requesting transmission of information of the setup item to the in-vehicle equipment 200 (step S220). Thereby, the in-vehicle equipment 200 transmits CAN communication (an item response) for replying with the information of the setup item in response to the received CAN communication (item request). In FIG. 4, a case where the meter device 210 transmits CAN communication (an item response) for replying with information of setup item A (step S222), transmits CAN communication (an item response) for replying with information of setup item B (step S224), and transmits CAN communication (an item response) for replying with information of setup item N (step S226) is shown. The in-vehicle equipment 200 may transmit, for example, CAN communication (an item response) for replying with information of a plurality of setup items. The communicator 120 receives the CAN communication (an item response) transmitted from the in-vehicle equipment 200 in response to the transmitted CAN communication (an item request) and outputs the received setup item information to the equipment determiner 130.

On the basis of the information of the setup item output by the communicator 120, the equipment determiner 130 determines whether it is mounted equipment or unmounted equipment for all the setup items included in the list of the in-vehicle equipment information 112a, i.e., whether or not the in-vehicle equipment 200 capable of setting up or controlling the setup item is mounted, and updates the in-vehicle equipment information 112a on the basis of a discrimination result (step S230). In FIG. 5(b), an example of the in-vehicle equipment information 112a in which the mounting presence or absence information and the communication state information are updated with respect to the in-vehicle equipment information 112a of the initial state shown in FIG. 5(a) is shown. More specifically, in the updated in-vehicle equipment information 112a shown in FIG. 5(b), an example of the in-vehicle equipment information 112a in which the mounting presence or absence information corresponding to the information of setup item A transmitted in the CAN communication (item response) of step S222, the information of setup item B transmitted in the CAN communication (item response) of step S224, and the information of setup item N transmitted in the CAN communication (item response) of step S226 is updated to "mounted" and the communication state information is updated to "communication (CAN communication)" is shown.

Thereafter, the in-vehicle equipment setup device 100 causes the storage 110 to store the user setup information 114 including setup information of the in-vehicle equipment 200 when an instruction for the operation of the in-vehicle equipment 200 is issued by the user boarding the vehicle M this time according to a manipulation on the manipulation device 300 and the user is registered as in the process of the sequence diagram shown in FIG. 2.

Thereafter, while the ignition switch (not shown) is turned on, the equipment determiner 130 causes the communicator 120 to periodically transmit CAN communication (an item request) at predetermined time intervals and updates the in-vehicle equipment information 112a stored in the storage 110 on the basis of the information of the setup item output by the communicator 120. At this time, in the sequence diagram shown in FIG. 4, as in the sequence diagram shown in FIG. 2, for example, a case where there is no replay with the information of the setup item, or CAN communication may be interrupted, due to a change in the state of CAN communication while the vehicle M is running, is also conceivable. In this case, the equipment determiner 130 updates the mounting presence or absence information corresponding to the setup item for which an information reply has not been transmitted to "unmounted," and updates the communication state information corresponding to the setup item for which an information reply has not been transmitted due to the interruption of CAN communication to "no communication," i.e., updates the equipment to the communication interruption equipment. It is only necessary for the process of the equipment determiner 130 in this case to be equivalent to the processing of steps S142 to S150 in the sequence diagram shown in FIG. 2 and the process of the equipment determiner 130 can be easily conceivable. Therefore, a detailed description related to an example of the process of updating the in-vehicle equipment information 112a in the equipment determiner 130 in this case and the updated in-vehicle equipment information 112a will be omitted. Furthermore, it is only necessary for a notification in a case where the user has manipulated a setup item capable of being set up or controlled by the in-vehicle equipment application a or a case where the user has manipulated a setup item incapable of being set up or controlled by the in-vehicle equipment application a to be equivalent to the notification in the in-vehicle equipment setup device 100 described with reference to FIGS. 2 and 3 and the notification is also easily conceivable. Therefore, a detailed description of the notification for the user in the in-vehicle equipment setup device 100 will also be omitted.

Thereafter, for example, the vehicle M arrives at the destination and the ignition switch (not shown) (which may be the ignition key) is turned off (IG_OFF) by the user on board (step S160). Thereby, the operation of each component of the electrical system including the in-vehicle equipment 200 provided in the vehicle M is ended and the CAN communication (including the interrupted CAN communication) established between the in-vehicle equipment 200 and the communicator 120 is ended. Thereby, the equipment determiner 130 determines each setup item as, for example, communication interruption equipment in which CAN communication is temporarily interrupted, although it is not unmounted equipment due to a failure. Also, the equipment determiner 130 causes the in-vehicle equipment information 112a stored in the storage 110 to be updated and held on the basis of a discrimination result (step S270). Here, in the in-vehicle equipment information 112a held by the equipment determiner 130 in the processing of step S270, the communication state information corresponding to all setup items are updated to "no communication" due to the fact that the ignition switch (not shown) is turned off in step S160, and the mounting presence or absence information indicates that a previous state is maintained. It is only necessary for the in-vehicle equipment information 112a in this case to be equivalent to the in-vehicle equipment information 112 shown in FIG. 3(d) and the in-vehicle equipment information 112a is easily conceivable. Therefore, a detailed description of an example of the updated (held) in-vehicle equipment information 112a in this case will be omitted.

Thereafter, the in-vehicle equipment setup device 100, for example, periodically iterates the processing of steps S220 to S230 when the ignition switch (not shown) (which may be the ignition key) is turned on (IG_ON) by a user boarding the vehicle M and performs the processing of step S270 again when the ignition switch (not shown) (which may be the ignition key) is turned off (IG_OFF). For this reason, the equipment determiner 130 updates the mounting presence or absence information and the communication state information to the held in-vehicle equipment information 112a on the basis of the information of the setup items output by the communicator 120.

According to such a processing flow, the in-vehicle equipment setup device 100 causes the storage 110 to store the in-vehicle equipment information 112*a* of the initial state when the in-vehicle equipment application a is executed for the first time, and then transmits CAN communication (an item request) with the communicator 120 and updates the in-vehicle equipment information 112*a* on the basis of the information of the setup items indicated in the received CAN communication (item response). Thereby, the in-vehicle equipment application a executed in the in-vehicle equipment setup device 100 can set up or control each setup item in a state in which it is confirmed what setup items are available in the vehicle M or the in-vehicle equipment 200, which setup items can be set up or controlled, and the like. In other words, when the user issues an instruction to manipulate the setup item, the in-vehicle equipment application a can set up or control the setup item without confirming whether or not the setup item indicated in the instruction can be set up or controlled each time. This is effective for the user (convenience is improved) because the user can manipulate the setup item more quickly and more suitably when the user manipulates the setup item of the vehicle M or the in-vehicle equipment 200.

As described above, according to the in-vehicle equipment setup device 100 of the embodiment, a shared general-purpose in-vehicle application is executed so that the same one can be used in a plurality of vehicles and the in-vehicle equipment information 112 of the initial state is stored in the storage 110. In the in-vehicle equipment setup device 100 of the embodiment, the equipment determiner 130 updates the in-vehicle equipment information 112 stored in the storage 110 (more specifically, the mounting presence or absence information and the communication state information included in the in-vehicle equipment information 112) on the basis of the state of CAN communication between the communicator 120 and the in-vehicle equipment 200 (including a setup item information request and response). More specifically, the equipment determiner 130 updates the in-vehicle equipment information 112 by determining whether in-vehicle equipment is in-vehicle equipment 200 (mounted equipment) mounted in the vehicle M, in-vehicle equipment not mounted in the vehicle M (unmounted equipment), or in-vehicle equipment 200 (communication interruption equipment) in which CAN communication has been interrupted on the basis of the state of CAN communication. Moreover, in the in-vehicle equipment setup device 100 of the embodiment, the equipment determiner 130 updates the in-vehicle equipment information 112 by determining the in-vehicle equipment 200 as the communication interruption equipment without determining the in-vehicle equipment 200 as the unmounted equipment when CAN communication is interrupted due to some factor (including a failure) after CAN communication with the in-vehicle equipment 200 is established once. Thereby, the in-vehicle equipment application executed in the in-vehicle equipment setup device 100 of the embodiment can set up or control the in-vehicle equipment 200 in a state in which it is confirmed what type of in-vehicle equipment 200 is mounted in the vehicle M, which in-vehicle equipment can be controlled, and the like.

Further, according to the in-vehicle equipment setup device 100 of the embodiment, the manipulator 150 (more specifically, the notifier 154) notifies the user of a state of a manipulation on the in-vehicle equipment 200 corresponding to an instruction issued by the user with the notification device 400 (i.e., the display 402 or the speaker 404). Moreover, in the in-vehicle equipment setup device 100 of the embodiment, the equipment determiner 130 notifies the user that a manipulation on the in-vehicle equipment 200 indicated in the instruction cannot be performed (a manipulation is impossible) with the notification device 400 when the instruction issued by the user is for unmounted equipment or communication interruption equipment. Thereby, the user of the vehicle M equipped with the in-vehicle equipment setup device 100 of the embodiment can visually and/or audibly recognize a state of a manipulation for the in-vehicle equipment 200 indicated in the instruction and the fact that a manipulation of the instruction is impossible.

Thereby, in the in-vehicle equipment setup device 100 of the embodiment, even in the configuration in which a general-purpose in-vehicle equipment application is executed, it is possible to improve the convenience of a manipulation on the in-vehicle equipment 200 by the user of the vehicle M equipped with the in-vehicle equipment setup device 100 and preferably set up or control the in-vehicle equipment 200 with a general-purpose in-vehicle equipment application for each user (according to the user). Thereby, in the vehicle M equipped with the in-vehicle equipment setup device 100 of the embodiment, the user can concentrate on driving the vehicle M, and the vehicle M can continue to run more safely.

In the in-vehicle equipment setup device 100 of the above-described embodiment, a case in which the equipment determiner 130 determines the in-vehicle equipment 200 in which CAN communication has been interrupted as communication interruption equipment instead of unmounted equipment has been described. However, some factor that causes the in-vehicle equipment 200 to become communication interruption equipment whose CAN communication is established once is considered to be another factor other than the failure described in the embodiment. For example, when the in-vehicle equipment 200 is removed, the in-vehicle equipment 200 before removal becomes communication interruption equipment. In consideration of such a case, the in-vehicle equipment setup device 100 may, for example, be manually manipulated by a user to change (update) the in-vehicle equipment 200 that is communication interruption equipment in the in-vehicle equipment information 112 to an initial value state (i.e., the mounting presence or absence information is "unmounted" and the communication state information is "no communication"). At this time, the in-vehicle equipment setup device 100 may be configured so that it is possible to initialize the in-vehicle equipment information 112 itself as well as the mounting presence or absence information or the communication state information of the in-vehicle equipment 200 serving as the communication interruption equipment in the in-vehicle equipment information 112 to an initial value state (i.e., reset the information to the initial state). When the in-vehicle equipment information 112 is initialized, it is only necessary for the in-vehicle equipment setup device 100 to perform the processing of step S100 in the sequence diagram shown in FIG. 2 or the processing of step S200 in the sequence diagram shown in FIG. 4 once by executing the in-vehicle equipment application. Because a method of initializing the in-vehicle equipment information 112 in the in-vehicle equipment setup device 100 can be easily conceived, a detailed description will also be omitted.

In the above-described embodiment, an example of a case where the shared general-purpose in-vehicle equipment application is stored when the storage device (for example, which may be used as the storage 110) provided in the in-vehicle equipment setup device 100 is in a state of a separate item before it is installed in the vehicle M has been described. However, this is only an example, and the in-vehicle equipment application may be, for example, later downloaded by the user from the server device S or another computer device via the network NW. In this case, it is only necessary to perform a process equivalent to the above-described embodiment when the downloaded in-vehicle equipment application is executed for the first time in the in-vehicle equipment setup device 100. Therefore, a detailed description of the process when the in-vehicle equipment setup device 100 executes a subsequently downloaded in-vehicle equipment application will be omitted.

According to the in-vehicle equipment setup device 100 of the above-described embodiment, the in-vehicle equipment setup device 100 for performing a setup for operating each of a plurality of pieces of in-vehicle equipment 200 mounted in a vehicle M includes: the storage 110 configured to store at least in-vehicle equipment information 112 in which mounting presence or absence information indicating whether or not the in-vehicle equipment 200 has been mounted is shown and user setup information 114 in which setup information about a setup of the in-vehicle equipment 200 desired by a user of the vehicle M is shown for each user; the equipment determiner 130 configured to determine whether the in-vehicle equipment 200 included in the in-vehicle equipment information 112 is mounted equipment, which is the in-vehicle equipment 200 mounted in the vehicle M, or unmounted equipment, which is the in-vehicle equipment 200 not mounted in the vehicle M; and the setter 140 configured to perform the setup of the in-vehicle equipment 200 corresponding to the setup information shown in the user setup information 114 on the basis of the in-vehicle equipment information 112, wherein the equipment determiner 130 updates the mounting presence or absence information included in the in-vehicle equipment information 112 on the basis of a result of determining the mounted equipment and the unmounted equipment, and wherein the setter 140 performs a setup indicated in the setup information indicated in the user setup information 114 of the user that has been selected with respect to the in-vehicle equipment 200 that is the mounted equipment as indicated in the mounting presence or absence information included in the in-vehicle equipment information 112, whereby it is possible to preferably set up or control the in-vehicle equipment 200 with an operating system or an application (general-purpose in-vehicle equipment application) for each user. Thereby, in the vehicle M equipped with the in-vehicle equipment setup device 100, the convenience of the manipulation on the in-vehicle equipment 200 by the user can be improved, the user can concentrate on driving the vehicle M, and the vehicle M can continue to run more safely.

The embodiment described above can be represented as follows.

An in-vehicle equipment setup device for performing a setup for operating each of a plurality of pieces of in-vehicle equipment mounted in a vehicle includes:
a hardware processor; and
a storage device storing a program,
wherein the hardware processor reads and executes the program stored in the storage device to:
determine whether the in-vehicle equipment included in at least in-vehicle equipment information in which mounting presence or absence information indicating whether or not the in-vehicle equipment has been mounted is shown stored in a storage is mounted equipment, which is the in-vehicle equipment mounted in the vehicle, or unmounted equipment, which is the in-vehicle equipment not mounted in the vehicle;
update the mounting presence or absence information included in the in-vehicle equipment information on the basis of a result of determining the mounted equipment and the unmounted equipment; and
perform a setup indicated in the setup information indicated in the user setup information of the user that has been selected within user setup information in which setup information about a setup of the in-vehicle equipment desired by a user of the vehicle is shown for each user stored in the storage with respect to the in-vehicle equipment that is the mounted equipment as indicated in the mounting presence or absence information included in the in-vehicle equipment information.

Although modes for carrying out the present invention have been described above using embodiments, the present invention is not limited to the embodiments and various modifications and substitutions can also be made without departing from the scope and spirit of the present invention.

What is claimed is:

1. An in-vehicle equipment setup device for performing a setup for operating each of a plurality of pieces of in-vehicle equipment mounted in a vehicle, the in-vehicle equipment setup device comprising:
a storage to store at least in-vehicle equipment information in which mounting presence or absence information indicating whether or not the in-vehicle equipment has been mounted is shown and user setup information in which setup information about a setup of the in-vehicle equipment desired by a user of the vehicle is shown for each user;
an equipment determiner to determine whether the in-vehicle equipment included in the in-vehicle equipment information is mounted equipment, which is the in-vehicle equipment mounted in the vehicle, or unmounted equipment, which is the in-vehicle equipment not mounted in the vehicle; and
a setter to perform the setup of the in-vehicle equipment corresponding to the setup information shown in the user setup information based on the in-vehicle equipment information,
wherein the equipment determiner updates the mounting presence or absence information included in the in-vehicle equipment information based on a result of determining the mounted equipment and the unmounted equipment, and
wherein the setter performs a setup indicated in the setup information indicated in the user setup information of the user that has been selected with respect to the in-vehicle equipment that is the mounted equipment as indicated in the mounting presence or absence information included in the in-vehicle equipment information.

2. The in-vehicle equipment setup device according to claim 1, further comprising a communicator to communicate with the in-vehicle equipment,
wherein the equipment determiner determines that the in-vehicle equipment for which the communication has been established in the communicator is the mounted equipment.

3. The in-vehicle equipment setup device according to claim 2, wherein the equipment determiner
determines that the in-vehicle equipment in which the communication with the communicator has been interrupted is communication interruption equipment that is the in-vehicle equipment but is communication interruption equipment incapable of performing communication, and
updates the in-vehicle equipment information by associating communication state information indicating that the communication has been interrupted with the mounting presence or absence information of the mounted equipment determined to be the communication interruption equipment.

4. The in-vehicle equipment setup device according to claim 3, further comprising:
   a voice manipulator to manipulate at least one piece of the in-vehicle equipment in accordance with voice uttered by the user; and
   a notifier to notify the user of a state of a manipulation for the in-vehicle equipment,
   wherein the voice manipulator
   performs a manipulation corresponding to voice of a manipulation on the in-vehicle equipment that is the mounted equipment as indicated in the mounting presence or absence information included in the in-vehicle equipment information when the user has uttered the voice, and
   causes the notifier to provide the notification indicating that the in-vehicle equipment cannot be manipulated when the user utters the voice of the manipulation on the in-vehicle equipment that is the unmounted equipment or the communication interruption equipment as indicated in the mounting presence or absence information included in the in-vehicle equipment information.

5. An in-vehicle equipment setup method comprising:
   determining, by a computer of an in-vehicle equipment setup device for performing a setup for operating each of a plurality of pieces of in-vehicle equipment mounted in a vehicle, whether the in-vehicle equipment included in at least in-vehicle equipment information in which mounting presence or absence information indicating whether or not the in-vehicle equipment has been mounted is shown stored in a storage is mounted equipment, which is the in-vehicle equipment mounted in the vehicle, or unmounted equipment, which is the in-vehicle equipment not mounted in the vehicle;
   updating, by the computer, the mounting presence or absence information included in the in-vehicle equipment information based on a result of determining the mounted equipment and the unmounted equipment; and
   performing, by the computer, a setup indicated in the setup information indicated in the user setup information of the user that has been selected within user setup information in which setup information about a setup of the in-vehicle equipment desired by a user of the vehicle is shown for each user stored in the storage with respect to the in-vehicle equipment that is the mounted equipment as indicated in the mounting presence or absence information included in the in-vehicle equipment information.

6. A non-transitory computer-readable storage medium storing a program for causing a computer of an in-vehicle equipment setup device for performing a setup for operating each of a plurality of pieces of in-vehicle equipment mounted in a vehicle to:
   determine whether the in-vehicle equipment included in at least in-vehicle equipment information in which mounting presence or absence information indicating whether or not the in-vehicle equipment has been mounted is shown stored in a storage is mounted equipment, which is the in-vehicle equipment mounted in the vehicle, or unmounted equipment, which is the in-vehicle equipment not mounted in the vehicle;
   update the mounting presence or absence information included in the in-vehicle equipment information based on a result of determining the mounted equipment and the unmounted equipment; and
   perform a setup indicated in the setup information indicated in the user setup information of the user that has been selected within user setup information in which setup information about a setup of the in-vehicle equipment desired by a user of the vehicle is shown for each user stored in the storage with respect to the in-vehicle equipment that is the mounted equipment as indicated in the mounting presence or absence information included in the in-vehicle equipment information.

* * * * *